2 Sheets—Sheet 1.

T. B. FARRINGTON.
Tap or Nipple for Water and Gas Mains.

No. 223,327.  Patented Jan. 6, 1880.

Witnesses
Willis P. Dickinson
Chas Gardner

Inventor
Thomas B. Farrington
Per M. S. Dayton
Atty.

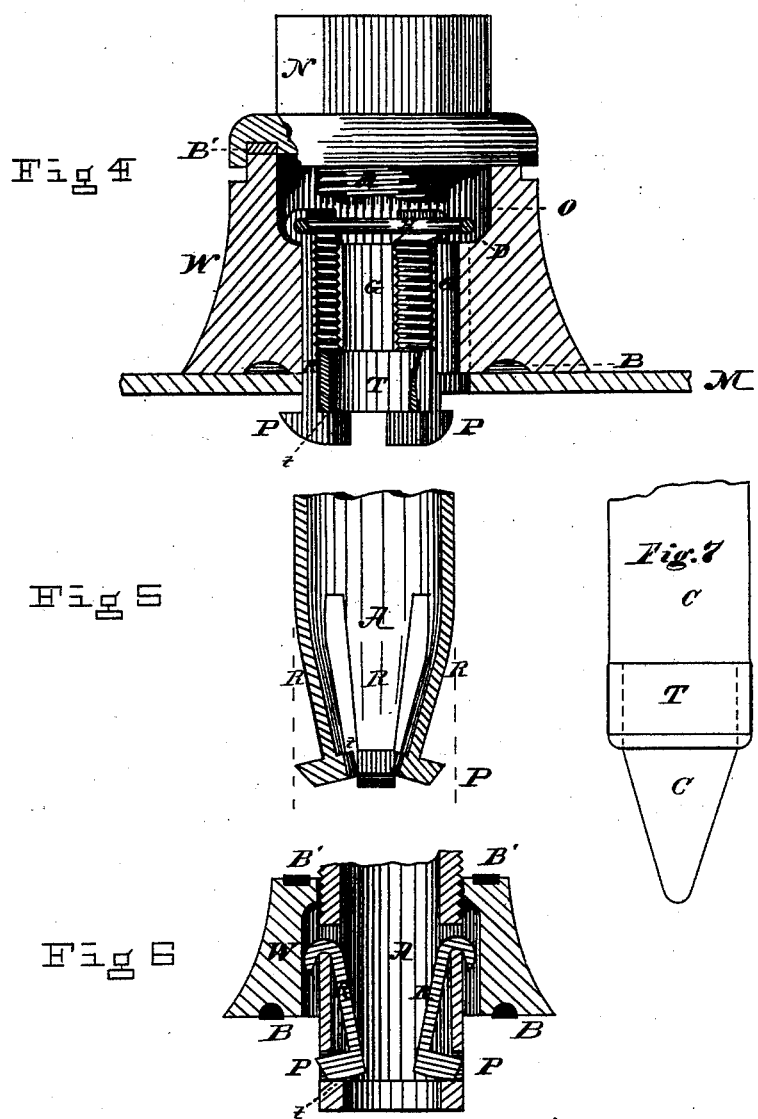

UNITED STATES PATENT OFFICE.

THOMAS B. FARRINGTON, OF CHICAGO, ILLINOIS.

TAP OR NIPPLE FOR WATER AND GAS MAINS.

SPECIFICATION forming part of Letters Patent No. 223,327, dated January 6, 1880.

Application filed December 11, 1879.

*To all whom it may concern:*

Be it known that I, THOMAS B. FARRINGTON, of Chicago, Illinois, have invented certain new and useful Improvements in Taps or Nipples for Water and Gas Mains, of which the following is a specification, reference being had to the accompanying drawings, which form a part thereof.

My invention relates to the mode of securing the nipple to the main; and it consists in throwing out grapples from the nipple-tube, or an extension thereof, after inserting the same into the orifice of the main, which cooperate with exterior tightening devices to hold the nipple rigidly to the main. It is applicable to other uses wherein it is desired to secure a tube to a hollow or other body; but this specification and the accompanying drawings describe its application to a water-main wherein the body of the main is too thin to hold a screw.

Figure 1:
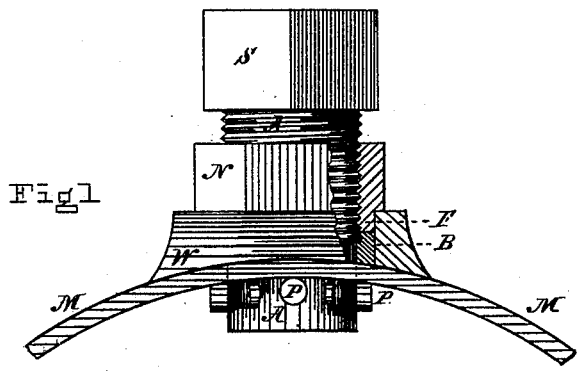
Figure 2:
Figure 3:
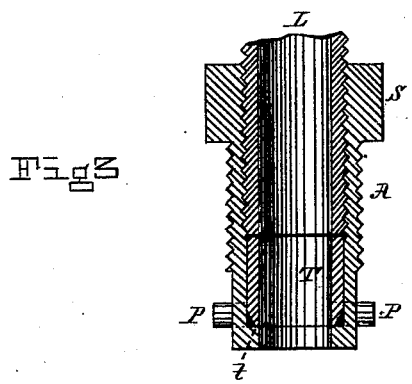

Figure 1 is an elevation, partly in section, showing the nipple secured to the main. Fig. 2 is an end view of the nipple-tube, showing the position of the grapples in the tube preparatory to its insertion into the main. Fig. 3 is a longitudinal section of the tube, showing a thimble therein in advance of the service-pipe or leader. Figs. 4, 5, and 6 show the grapples in the form of hooks suspended by arms extending upward, by which they are movably connected to other parts, with other modifications.

First, in Figs. 1, 2, and 3, A is a metal tube, having radial perforations near the bottom, to which short pins P P are fitted, capable of being moved inward flush with the exterior of the tube, as shown in Fig. 2. Above the pins the tube is threaded to receive the nut N.

W is a metal washer, shaped on its under face to conform to the curvature of the main M. B is a packing, of lead or other suitable material, placed within the nut, and F a follower upon the nut N.

To secure the nipple to the main, the hole in the main should be of a size to just freely admit the lower end of the tube A, which is inserted far enough to carry the pins beyond the inner surface of the main. In this position they are thrust outward by means of a conical wedge which may be provided for the purpose, and which is then withdrawn. The pins project far enough to oppose the nut N, which is next run down upon the washer W and packing B, making the nipple rigid with the main and effectually closing the joint.

For the purpose of holding the tube A from turning while the nut is being run down, the square S, or its equivalent, is provided; or the main orifice may be notched to receive a feather upon the tube below the thread.

The service-pipe or leader may be screwed into the nipple-tube either with or without the thimble T; or it may be screwed upon the outside of the tube. If the square S is used, the internal diameter may be so enlarged, to receive the leader within this square, as to give uniform diameter to the entire passage.

The perforations in the tube to receive the pins P P are preferably made in a line, to bring all the pins at once into contact with the main, wherefore it will be better if each nipple, with its washer, is specially made to connect with a given size of main.

For the purpose of retaining the pins P P in place in the tube ready for use, the holes in the tube should be slightly countersunk, especially on the outside, and the pins correspondingly headed.

In Fig. 4 the hooks P P answer to the pins already described. They are suspended by the arms R R from a common hinge or connection, H, and are supported, when the tube A is withdrawn, by the shoulder D of the recess O within the washer W.

G is a feather within the washer, operating between the arms to prevent their turning while the tube is being run down. These arms may together form a tube longitudinally sected, so as to permit the hooks P P at their lower ends to enter the orifice of the main. They are also threaded to receive the tube A, having the nut or shoulder N solid with it. By running the tube down with the shoulder against the washer the arms and hooks are drawn up firmly against the interior of the main.

In Fig. 5 the arms and hooks are solid with the tube A, and the arms are bent inward to enter the main, and the tube is preferably drawn upward by a loose nut operating upon a deep washer. The hooks are thrown outward to grapple the main by means of the conical wedge already mentioned; but in order to permanently hold them out the wedge should carry with it a thimble, T, Fig. 7, and leave it resting upon the shoulders *t* within the embrace of the arms R R.

In Fig. 6 another mode of suspending the pins P P is illustrated, in which the arms R R are hinged directly to the tube A.

In the use of the recessed washers shown in Figs. 4 and 6, and probably of the deep washer necessary for the form of tube A shown in Fig. 5, two packings will be required, one, B, between the washer and main, and one, B', between the nut and washer.

The thimble T may be found desirable in each of the several constructions, but is not indispensable. Obviously, in some applications of my invention the washer W may be dispensed with.

Applied to a wooden or cement main, the grapples P P may be expanded into the substance of the main instead of beneath it, as shown.

Having thus described my invention, what I claim, and desire to secure by Letters Patent, is—

1. In a tap or nipple applicable from the outside to a hollow body, expansible hooks or pins, by which the nipple or tap may be grappled to the body and rigidly secured thereto, substantially as and for the purposes set forth.

2. The combination of the nipple-tube A, the pins P P, and the nut N, substantially as described, and for the purposes specified.

3. The combination of the tube A, the pins P P, and the nut N with the washer W, Fig. 1, with or without the packing B, substantially as and for the purposes described.

4. In a tap or nipple, expansible grapples supported by a part or parts of the tap movable radially to the main, in combination with suitable devices for outwardly drawing and holding said grapples firmly against the interior of the main after their expansion therein, substantially as described, and for the purposes set forth.

5. The thimble T, in combination with the expansible grapples P P, substantially as and for the purposes specified.

THOMAS B. FARRINGTON.

Witnesses:
WILLIS P. DICKINSON,
CHAS. GARDNER.